March 23, 1965 N. BRADLEY 3,174,907
METHOD OF OPERATING A STEAM GENERATING NUCLEAR REACTOR
Filed May 23, 1960 7 Sheets-Sheet 6
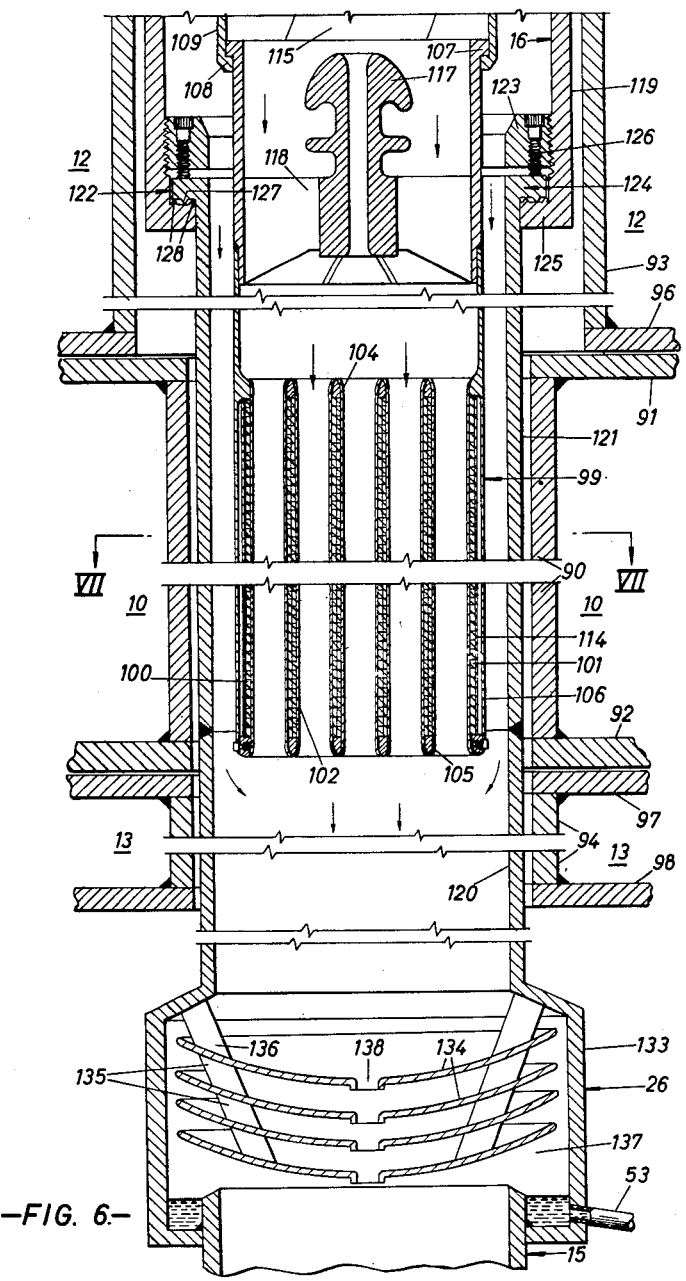
-FIG. 6.-

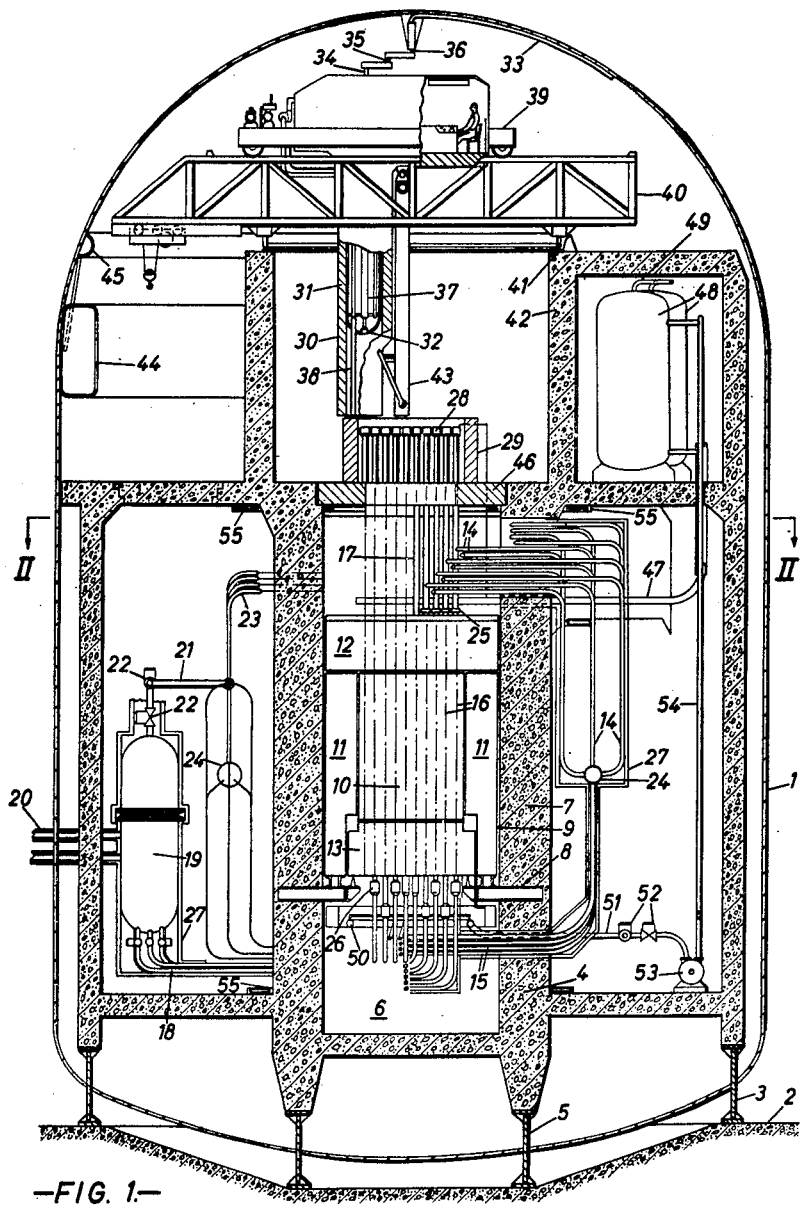
-FIG. 1.-

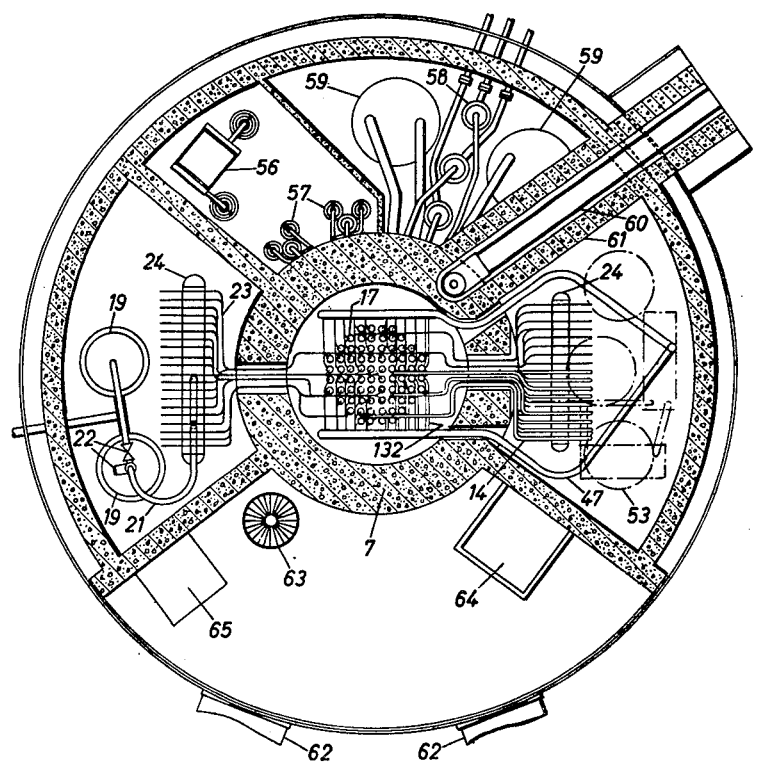
—FIG. 2.—

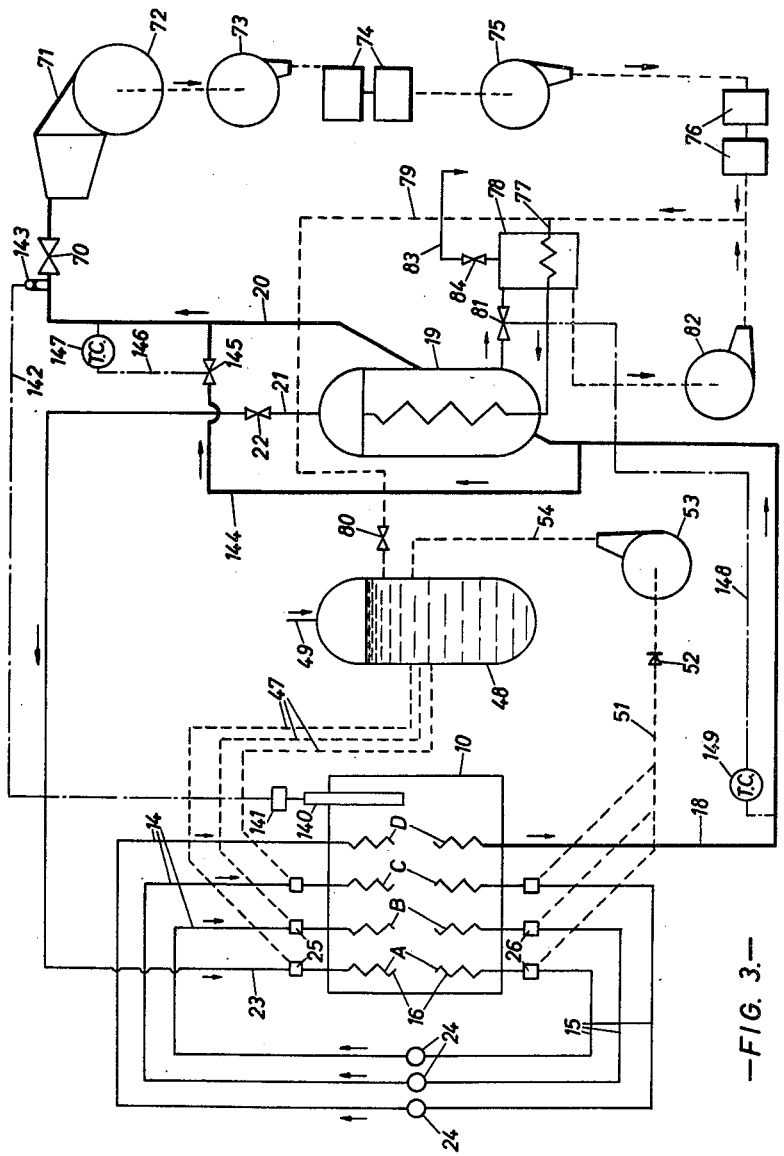

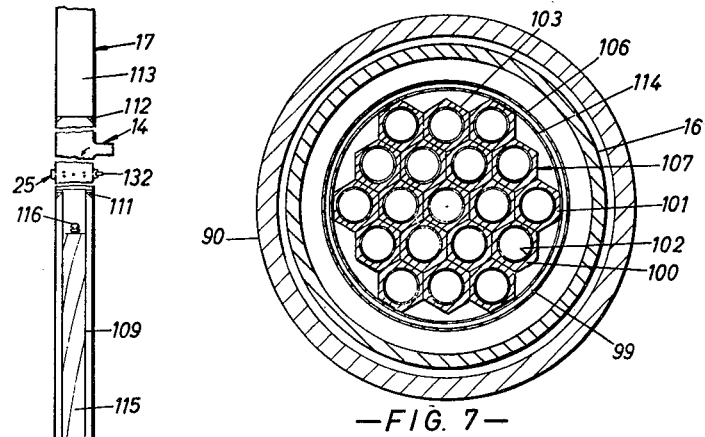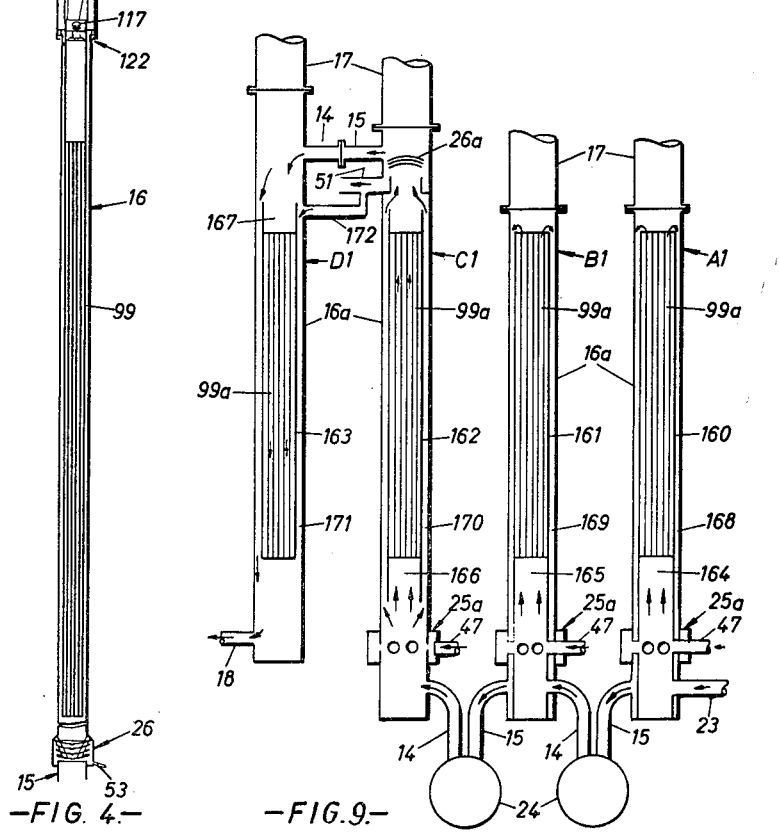

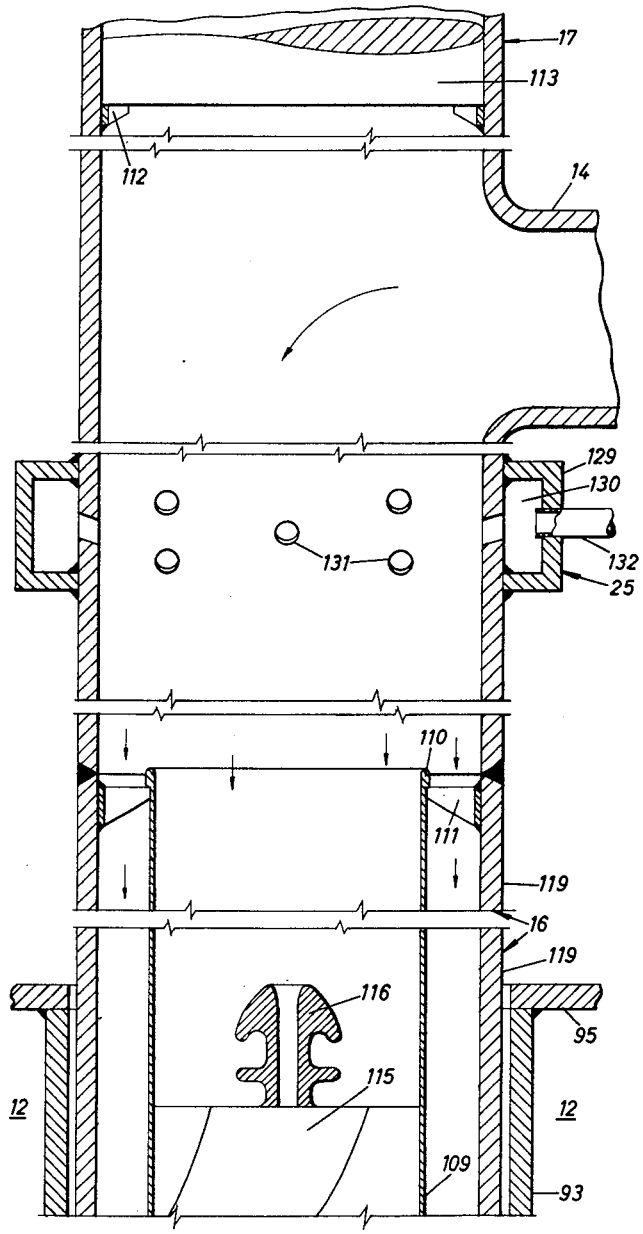
—FIG. 5.—

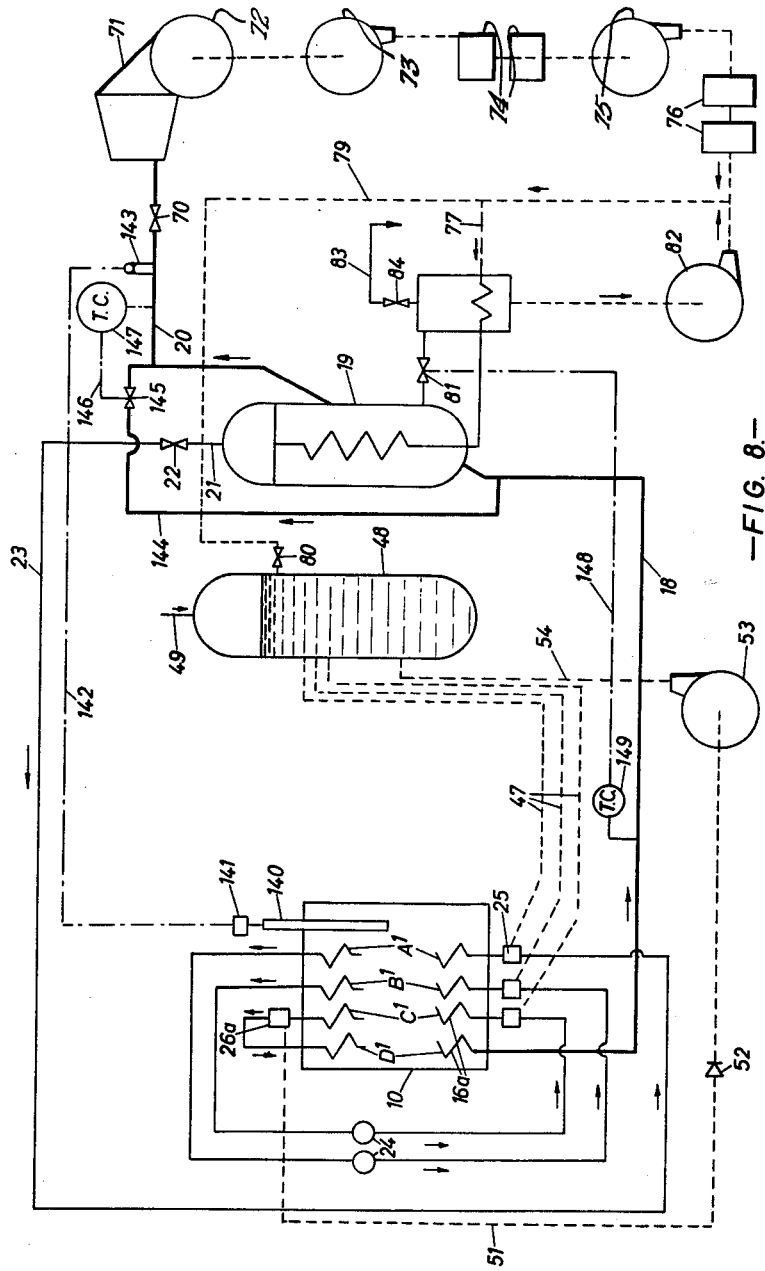

United States Patent Office 3,174,907
Patented Mar. 23, 1965

3,174,907
METHOD OF OPERATING A STEAM GENERATING NUCLEAR REACTOR
Norman Bradley, Culcheth, Warrington, England, assignor to United Kingdom Atomic Energy Authority, London, England
Filed May 23, 1960, Ser. No. 31,134
Claims priority, application Great Britain, June 4, 1959, 19,148/59
2 Claims. (Cl. 176—54)

This invention relates to steam generating nuclear reactors of the kind wherein steam is produced by direct contact with the heat-producing core of a reactor and not in secondary heat exchange with a reactor core coolant.

It is an object of the invention to provide an improved form of such a steam generating nuclear reactor.

According to the invention, a steam-generating nuclear reactor having a heat producing reactor core has means causing a first mixture of feed water and steam to flow in heat exchange with the reactor core to raise saturated steam, means for mixing the saturated steam so raised with feed water to form a second mixture of feed water and steam, means causing said second mixture to flow in heat exchange with the reactor core to raise further saturated steam and means causing said further saturated steam to flow in heat exchange with the reactor core to receive superheat therefrom.

A mixture of steam and water is far superior as a heat transfer media to that of steam or water used singly. The ranges of 10-20% steam and correspondingly 90-80% water appear to offer the best heat transfer steam/water mixtures.

Embodiments of the invention will now be described by way of example with reference to the accompanying drawings wherein:

FIG. 1 is a sectional elevation of a nuclear reactor.
FIG. 2 is a sectional plan view on the line II—II of FIG. 1.
FIG. 3 is a flow sheet of the embodiment of FIG. 1.
FIG. 4 is a sectional elevation of a pressure tube.
FIG. 5 is an enlarged sectional view of the upper part of a pressure tube.
FIG. 6 is a sectional view of the lower part of a pressure tube.
FIG. 7 is a sectional plan view on the line VII—VII of FIG. 6.
FIG. 8 is a flow sheet of a further embodiment, and
FIG. 9 a diagrammatic view thereof.

Referring to FIGURE 1, a steam-generating reactor containment vessel 1 is supported on a base 2 by external beams 3. The contents of the vessel 1 are supported in and on a concrete chamber 4 which is carried by internal beams 5. The chamber 4 has an inner compartment 6, the walls of which are of sufficient thickness to constitute a biological shield 7. The shield 7 carries support beams 8 for a calandria type core vessel 9. The vessel 9 contains a heat-producing reactor core 10 which is surrounded by light water reflector contained in side compartments 11 and heavy water reflector contained in upper and lower compartments 12, 13. Coolant for the core 10 enters by way of pipes 14 and leaves by way of pipes 15. The pipes 14, 15 connect with a series of pressure tubes 16, the upper ends of which are connected to stand pipes 17. The pressure tubes 16 locate nuclear fuel elements and are divided up into four groups (A, B, C and D of FIG. 3) each of which constitutes a flow pass through the core 10. Pipes 18 lead steam outflowing from the pressure tubes 16 of the final pass (D) to two evaporators 19, the steam then being led to a turbine stop valve by way of pipes 20 penetrating the containment 1. Steam generated in the evaporators 19 is led by pipes 21 and via a stop valve 22 to pipes 23 which connect with the first flow pass (A) formed by a group of the pressure tubes 16. The pipes 15 conduct outflowing steam from the first, second and third flow passes (A, B and C) of the core 10 to headers 24 whence the pipes 14 conduct the steam to the second, third and fourth flow passes (B, C and D) of the core. The upper ends of the pressure tubes 16 of the first, second and third passes are equipped with feed water spray chambers 25 and the lower ends are equipped with water separators 26.

The evaporators 19, headers 24, and pipes 14, 15, 23 are enclosed in heat-insulation 27. The upper ends of the standpipes 17 are closed by caps 28 and the standpipes are enclosed in a circular shield 29 supported by a gamma-shield 46 located in the upper face of the biological shield 7. Refuelling of the reactor is performed by a refuelling machine 30 disposed above the standpipes 17. The machine 30 is provided with shielding 31 and includes a pressure vessel 32 steam-pressurised through a steam line 33 having rotatable joints 34, 35, 36, a rotatable fuel element magazine 37 and a charging barrel 38. The machine is carried by a carriage 39 traversable on a polar gantry 40. The gantry 40 is rotatable about a circular track 41 carried on a concrete support 42. The carriage 39 also carries control rod removal gear within a pivotable container 43.

The reactor core 10 is moderated by heavy water which is retained under a blanket of helium with helium pressure control to allow adjusting the level of heavy water in order to affect coarse control of the reactor and to allow dumping of the heavy water to shut down the reactor. (This system has already been described in relation to the Canadian N.P.D. reactor which is shown in FIGURE 7 of Paper No. P/209 delivered at the Second United Nations Conference on the Peaceful Uses of Atomic Energy, Geneva, 1958.) The helium for the system is retained in an annular storage tank 44 feeding into a helium ring main 45.

Header pipes 47 connect water storage tanks 48 with the feed water spray chambers 25 and the water in the tanks is pressurised by high pressure steam admitted through steam lines 49. Water separated out by the separators 26 collects in a ring main 50 whence it is returned to the tanks 48 by way of pipes 51, non-return valves 52, circulating pumps 53 and pipes 54.

Ducting 55 is provided for the circulation of air-coolant around the shield 7, the coolant being circulated and cooled by a pump, motor and heat exchanger unit 56 (FIGURE 2).

In FIGURE 2, some of the components identified on FIGURE 1 are shown together with pump and heat exchanger units 57 for the circulation and cooling of the light water shielding, similar units 58 for the circulation and cooling of the heavy water shielding and moderator and dump tanks 59 for the emergency dumping of the heavy water moderator. In addition, there is shown a fuel element discharge chute 60 penetrating the containment 1 and connectable with the charging barrel 38 (FIGURE 1) of the refuelling machine 30. The chute 60 is provided with concrete biological shielding 61.

Various access facilities are also shown including personnel air locks 62, a stairway 63, a maintenance well 64 and a personnel lift 65.

FIGURE 3 is a flow sheet of reactor coolant wherein thick unbroken lines indicate superheated steam, thin unbroken lines saturated steam, thin broken lines feed water and chain-dotted lines control signal circuits. Dry saturated steam generated in the evaporators 19 is led to the pressure tubes 16 of the flow pass A where it is mixed with feed water sprayed from the spray chambers 25. The proportions of steam and water in the mixture are about 20% and 80% respectively and the mixture then flows through the pressure tubes 16 of the pass A, where a proportion of the water of the mixture absorbs heat and becomes steam, emerging as a 50%–50% mixture. Water is separated out of the mixture by the water separators 26 and steam in a dry saturated state is led to the pressure tubes 16 of the flow pass B. Feed water in spray form is again mixed with the steam to form a 20%–80% steam and water mixture as before and the mixture flows through the pass B to absorb heat and emerge in a 50%–50% condition. Water separator takes place once again at the separators 26 of the flow pass B and the mixing and separating process is repeated for the flow pass C. From the separators 26 of the flow pass C dry saturated steam is led without further mixing to the flow pass D where it acquires superheat, the superheated steam then being led by way of pipes 18 to the evaporators 19 to generate further saturated steam. From the evaporators 19, the steam, having lost some superheat is led via the pipes 20 to a turbine stop valve 70 and from thence to a power producing turbine 71.

Exhaust steam from the turbine 71 is discharged to a condenser 72 and the condensate is withdrawn from the condenser by an extraction pump 73 and passed to primary feed heaters 74. The heated condensate is drawn from the primary feed heaters 74 by a feed pump 75 and discharged as feed water to the secondary feed heaters 76 whence it flows, by way of a branch 77 to a control heater 78 and from thence to the evaporators 19 and by way of a branch 79 and control valve 80 to the storage tanks 48. The control heater is heated by superheated steam led from the evaporators 19 by way of a control valve 81. Condensed steam is returned to the discharge side of the feed heaters 76 by a condensate pump 82 and steam can be discharged from the control heater through a dump line 83 having a control valve 84. Fine control of the reactor is effected by a conventional control rod assembly 140 insertable into or withdrawable from the core 10 by means of a controller 141 coupled by a signal line 142 to a pressure controller 143 on the steam pipe 20 leading to the turbine 71. Steam temperature control at the reactor outlet (pass D) is effected by adjustment of the temperature of the feed water flowing through the control heater 78. The control valve 81 controlling the inflow of heating steam to the control heater 78 is opened and closed by signals emitted along a signal line 148 by a temperature controller 149 on the steam pipe 18 connecting the evaporator 19 with the superheating flow pass D. If the reactor outlet temperature rises, the control valve 81 is opened, thus adding sensible heat to the feed water inflowing to the evaporators 19 and facilitating the generation of steam in the evaporators so that the mass flow of steam through passes A, B, C and D increases to depress the outlet temperature. Closing of the control valve 81 has the opposite effect. Steam temperature at the turbine stop valve 70 is effected by controlling steam flow through a by-pass line 144, by-passing the evaporator 19 to connect directly the steam pipes 18 and 20. Steam flow through the by-pass line is varied by a control valve 145 on the receipt of signals emitted along a signal line 146 by a temperature controller 147 on the steam pipe 20.

FIGS. 4 to 7 show a typical pressure tube 16 of one of the passes A, B, C. A pressure tube 16 for the superheating pass D is similar except that it is not equipped with a spray chamber 25 or a separator 26. The tube 16 illustrated is shown (in FIG. 6) disposed in a calandria tube 90 of the reactor core 10. The tube 90 spaces top cover and bottom base plates 91, 92 of the calandria tank and tube extensions 93, 94 similarly space cover and base plates 95, 96 and 97, 98 of the reflector compartments 12 and 13.

The pressure tube 16 locates a nuclear fuel element 99 comprising a closed-packed nest 103 (see FIGURE 7) formed by columns 100 of stacks of $UO_2$ pellets 101. The pellets 101 are of hexagonal section and are penetrated by stainless steel coolant tubes 102 extending along the full length of the columns 100, to terminate in spacer plates 104, 105. The nest 103 is enclosed in a stainless steel casing 114 and supported by a tubular support 106 also of stainless steel, the support 106 having a flanged upper end 107 which is carried by a lower flanged end 108 of a further tubular support 109. The support 109 is of stainless steel and has a flanged upper end 110 supported by spaced lugs 111 welded to the upper end of the pressure tube 16.

Above the lugs 111 are spaced further lugs 112 which support a gamma-plug 13. The support 109 locates a neutron absorption device 115 providing helical paths which allow free passage of the steam/water coolant whilst preventing the passage of neutrons. The device 115 has a lifting head 116. The support 106 is provided with a lifting head 117 forming part of a spider 118 attached to the inner walls of the support 106. To remove the fuel element 99 from the pressure tube 16, the gamma plug 113 and device 115 are first removed and the fuel element 99 and support 106 then withdrawn by means of the lifting head 117.

The pressure tube 16 has upper and lower mild steel parts 119, 120 and an intermediate zirconium part 121. The mild steel parts 119, 120 are disposed mainly within the reflector compartments 12, 13 and the zirconium part 121 mainly within the reactor core 10. The fuel element 99 is located in the zirconium part 121. The part 121 is made of zirconium for reasons of neutron economy and is attached to the steel parts 119, 120 by upper and lower demountable joints of which the upper joint 122 only is shown. A degree of axial compensation at the joint 122 is provided by a compensating ring 123 screwed into the lower end of the steel part 119. An upper flanged end 124 of the zirconium part 121 is clamped to a lower flanged end 125 of the steel part 119 by bolts 126 carried in the compensating ring 123. A degree of radial expansion at the joint is effected by raised rings 127, 128 on the flanged ends 125, 124 respectively. Radial expansion at the joint 122 results in yielding of the rings 127, 128 by plastic deformation whilst maintaining a seal.

The feed water spray chamber 25 at the upper end of the pressure tube 16 takes the form of an annular casing 129 embracing the tube to define a compartment 130 with holes 131 penetrating the tube walls to connect the interior of the chamber 130 with the interior of the tube 16. The holes 131 are drilled at an angle to direct jets of feed water into the interior of the tube 16 in a downwards direction so as to mix thoroughly with a flow of steam entering the tube via the pipe 14. The feed water is fed to the compartment 130 by way of a pipe 132 connecting with header pipes 47 (FIGS. 1, 2 and 3).

The water separator 26 at the lower end of the pressure tube 16 includes a casing 133 enclosing a series of spaced baffles 134. The baffles 134 have a circular outline, are of concave section and are spaced from one another by struts 135. Extensions 136 of the struts 135 are welded to the upper end of the casing 133 to provide support to the baffles 134. The outer edges of the baffles 134 extend into an annular water collecting chamber 137. The baffles 134 have apertures 138 for through passage of a minor fraction of the steam/water mixture, the major fraction of the steam/water mixture being caused to flow around the baffles 134 at high velocity so that water is spun out towards the walls of the chamber 137. The drain pipe 51 (see also FIG. 3) removes water collecting in the chamber 137.

The mixture of steam/water passing down through the pressure tube 16 is divided into two fractions by the tubular support 109, a major coolant fraction passing within the support 109 to remove heat from the fuel element 99 and a minor coolant fraction passing along the annular channel defined by the tube 16 and the tubular support 109 to remove heat from the zirconium tube part 121. In both fractions, a proportion of the water in the coolant mixture absorbs latent heat and becomes steam and at the lower end of fuel element 99 the fractions re-join and the mixture passes into the water separator 26 where water is separated out and drained off via the pipe 51.

FIGURE 8 is a flow sheet of an alternative system of core cooling and is generally similar to the flow sheet of FIGURE 3, like components retaining the same reference numerals.

Referring to FIGURE 8, the core 10 is now cooled by a flow of coolant in an upward direction. Furthermore, only the pressure tubes 16a of a single flow pass $C_1$, are equipped for water separation (reference numeral 26a) and not, as in the previous embodiment, the three flow passes A, B and C.

FIGURE 9 is a diagrammatic figure of the core coolant system shown in FIGURE 8. With reference to FIGURE 9, the pressure tubes 16a of the flow passes $A_1$, $B_1$, $C_1$ and $D_1$ contain internal baffles 160, 161, 162, 163 locating nuclear fuel elements 99a, the baffles defining inner coolant flow channels 164, 165, 166, 167 and outer coolant flow channels 168, 169, 170 and 171 respectively.

In operation, dry saturated steam enters the pressure tubes 16a of the flow pass $A_1$ by way of pipe 23, mixes with feed water sprayed from the spray chamber 25a and a mixture of steam (about 20% steam) and water (above 80%) then flows upwardly through the inner flow channel 164 to pass in counter-flow down through the outer flow channel 168, a proportion of the water absorbing latent heat and becoming steam, the mixture emerging in a 50%–50% condition to pass into pipes 15 and from thence to the header 24. From the header 24 the mixture of steam and water passes into the pipes 14 leading to the pressure tubes 16a of the flow pass $B_1$, entering the inner flow channels 169 of the tubes to mix with further feed water in the same manner as before. The mixture, again in a 20% steam, 80% water condition then flows through the flow channels 165, 169 to emerge in a 50%–50% condition as before. The mixture is then led to a further header 24 by way of pipes 15 and from thence to the presence tubes 16a of the flow pass $C_1$ by way of pipes 15, and from thence to the pressure tubes 16a of the flow pass $C_1$ by way of pipes 14. The steam/water mixture then enters the inner flow channels 170 to mix with further feed water and in a 20% steam, 80% water condition passes upwardly through both the inner and outer flow channels 166, 170 to the water separator 26a where water is removed. Steam, in a substantially dry condition, then flows through connected pipes 14, 15 to pass into the pressure tubes 16a of the superheating flow pass $D_1$, and the separated water collects in the pipes 51 where most of it is removed by the pump 53 (FIG. 8). The remainder of the water in the pipes 51 is led by pipes 172 to the outer flow channels 171 of the pressure tubes 16a forming the flow pass $D_1$, to provide cooling of the pressure tube walls by absorbing latent heat and becoming steam. The steam entering the flow pass $D_1$ receives superheat in passage in the inner flow channels 171 and at the lower end of the baffles 163 joins with the steam formed in the outer flow channels 171. The superheated steam is then led to the turbine 71 (FIG. 8) by way of pipes 18.

The presence of water in the steam/water mixtures flowing through the non-superheating passes (e.g. A, B and C) of the reactor allows the fuel elements within these passes to operate at (relatively) low temperatures to enable a material such as zirconium to be used as a canning material. Zirconium has low neutron absorption properties and hence allows a low enrichment of the fuel in these passes. The fuel elements within the final, superheating pass (e.g. pass D) however require to be canned in a material such as stainless steel which, although possessing higher neutron absorption properties than zirconium is more stable at higher temperatures. The nuclear fuel in the superheating pass therefore needs to be of higher enrichment than the non-superheating passes. As the non-superheating passes constitute about 70% of the reactor core, the saving in enriched nuclear fuel is considerable. Although the mixtures of steam and water described in the embodiments have been of 20% and 80% respectively (before passage through the reactor care), the proportions of these mixtures are not intended to be specific. The ranges of 10–20% steam and 90–80% water vapor appear to offer the best heat transfer medias.

I claim:

1. A method of operating a nuclear reactor having a reactor core defining groups of flow-conducting channels extending therethrough with nuclear fuel in the channels, comprising passing a first mixture of feed water and steam through a first group of channels whereby latent heat is gained from nuclear fuel therein in the evaporation of water in the said first mixture, removing further water from said first mixture passing out of the first group of channels, mixing a metered quantity of feed water with said first mixture to form a second mixture of feed water and steam, passing said second mixture through a second group of channels whereby latent heat is gained from nuclear fuel therein in the evaporation of water in the second mixture to form saturated steam and then passing said saturated steam through a third group of channels to gain superheat.

2. A method as claimed in claim 1 wherein said first and second mixtures entering the first and second groups of channels are in the ranges of 10–20% steam and 90–80% feed water respectively.

References Cited in the file of this patent

UNITED STATES PATENTS

| 1,817,419 | Noack | Aug. 4, 1931 |
| 1,993,747 | Novac | Mar. 12, 1934 |
| 2,806,820 | Wigner | Sept. 17, 1957 |
| 2,938,845 | Treshow | May 31, 1960 |
| 2,975,118 | Tognoni | Mar. 14, 1961 |

FOREIGN PATENTS

| 214,136 | Australia | Jan. 24, 1957 |
| 799,725 | Great Britain | Aug. 13, 1958 |
| 1,190,224 | France | Jan. 17, 1958 |

OTHER REFERENCES

Proceedings of the Second International Conference on the Peaceful Uses of Atomic Energy, vol. 7, Geneva, Sept. 13, 1958, pp. 819–826.